United States Patent Office 2,921,835
Patented Jan. 19, 1960

2,921,835
METHOD OF PROCESSING MAGNESIUM BEARING BRINES

Alfred M. Thomsen, San Francisco, Calif.

No Drawing. Application March 15, 1957
Serial No. 646,200

1 Claim. (Cl. 23—67)

This application is a continuation, in part, of a former application bearing Ser. No. 529,075, filed August 17, 1955, under the title Processing Complex Silicates, said application issued March 19, 1957, under the number 2,785,950. In said patent applicant has described a method of purifying and recovering sundry forms of magnesium derived from complex magnesium containing silicates. Inasmuch as the same technique can also be applied to natural or other brines containing magnesium the instant application is being filed.

In general, natural brines are mixtures of sulphates and chlorides of the alkali metals containing much magnesium and less lime, also as chlorides and/or sulphates. The aim and object of my process is to separate the magnesium in the form of carbonate of high purity which generally demands a prior removal of as much of the calcium as possible. Both these metals having been removed in the form of substantially insoluble compounds it becomes simple to recover any other constituent parts, such as potassium and lithium, by conventional means. The removal of the former by crystallization and the latter by precipitation as phosphate being well known in the art.

In my preferred illustration, as given later on, I have used a carbonated form of ammonium to effect the purification of brine from calcium and also to precipitate the resident magnesium as carbonate but I do not confine myself to this limitation. Contrariwise I may use in the purification any carbonate of the alkali metals and to precipitate the magnesium I may likewise use any alkali metal carbonate or even their hydroxides.

Any table of solubilities will, of course, indicate that the carbonate of magnesium is somewhat more soluble than calcium carbonate, hence, an addition of any substance which will cause a precipitation of magnesium carbonate should induce a prior precipitation of calcium carbonate as long as any soluble calcium salt is present in the brine. This, unfortunately, is an academic distinction. In practice it will be found that calcium and magnesium are co-precipitated and that only slight differentiation in composition is effected either in the precipitate formed or in the residual brine.

However, if a long period of time is allowed after the addition of sufficient carbonate to precipitate, say twice the resident calcium, then therere will be quite some distinction. The fault rests in the fact that the precipitated calcium carbonate is present in such an extremely fine state of division that it passes through any filter cake as if it were a true colloid and thus cannot be separated either by settling or filtration. However, in the presence of an enormous excess of previously precipitated calcium carbonate the tendency of the newly precipitated calcium carbonate is to adhere to the previously formed particles of calcium carbonate thus augmenting their mass and still further enhancing the ease of their separation. To use these facts I operate in the following manner.

I commingle with the brine of an amount of precipitant approximately twice the stoichiometric requirements of the resident calcium. The resultant milky suspension is then run into a thickener where it is settled to thick sludge while clear brine overflows. This brine is not at once free from calcium, though perfectly clear. The thickened sludge is pumped from the bottom of the thickener and re-cycled to fresh brine commingled with precipitant as it enters the thickener thus increasing the suspended calcium carbonate to any extent desired. In due time, determined by a test on the overflow, substantially all of the calcium will have been transferred from the solution to the sludge and the overflow can then be used in the next step of the process being substantially free from calcium. Obviously, when this stage of completion of the reaction has been obtained then a portion of the circulating sludge is discarded as otherwise it would so build up that the thickener would no longer function. Parenthetically, it may be mentioned that borates and fluorides, if present in the brine, are largely if not entirely co-precipitated with the calcium and are thus removed from the purified brine.

I will now give a specific illustration of my process using a definite brine and a solution of carbonated ammonia as the precipitant. The brine has the following composition: $MgCl_2$—25%, $MgSO_4$—2%, $CaSO_4$—0.18%, KCl—2.6%, NaCl—1.5%, LiCl—0.2%, Br—0.1%; total salinity—31.58%. The peculiar characteristics of this brine is due to the fact that it is a residual from which much salt and potassium chloride has been removed by prior evaporation and crystallization. Such brine is, therefore, "natural" as to origin but "artificial" in the light of previous treatment. It will be obvious that my treatment would be the same were a truly "natural" or a truly "artificial" brine the subject involved.

To this brine I now add a solution of "carbonated" ammonia. By this term I do not specifically limit myself to a composition corresponding exactly to the normal carbonate as such a compound does not exist in solution, though analysis will indicate the presence of $NH_3$ and $CO_2$ in the correct amount. In such a solution, by hydrolysis, much of the ammonium will be actually present as hydroxide and a corresponding amount will be present as bi-carbonate. In order to suppress the effect of the hydroxide I carbonate the ammonia to a point wherein analysis will show an excess of $CO_2$ well above the stoichiometric amount to constitute the normal carbonate. This border is somewhat flexible but I prefer to operate with a compound corresponding to approximately two-thirds normal carbonate and one-third bi-carbonate.

I now add sufficient of this carbonated ammonia to the brine to combine stoichimetrically with all the resident calcium and then add an excess of at least the same amount. The "milky" product is then run into a thickener in which the settled sludge is continuously re-cycled with an ultimate discard of the increment thus continuously formed. The overflow from said thickener is my purified brine.

To said purified brine I now add enough carbonated ammonia to precipitate substantially all the remaining magnesium in said brine but unless the carbonated ammonia were in a very dilute form this would form a slurry so thick as to be semi-solid. To avoid this I perform the precipitation in stages with intermediate removal of solids, in the case of this brine I would use at least three stages, involving three separate filtrations of the slurry. As "substantially calcium-free" implies the presence of a little residual calcium, it follows that such precipitates would contain diverse amounts of calcium, and could thus be kept separate into "pure" and "less-pure" magnesium carbonate.

For most commercial purposes all such precipitates would classify as "pure" but in the event of the need of some carbonate of exceptional purity it would be rendered available at no additional expense. What has been said herein with reference to calcium applies with equal, or even greater force, to the presence of fluorine and boron, where the presence of even minimal amounts of such material would be considered as harmful.

Inasmuch as magnesium carbonate is soluble in excess of ammonium carbonate it follows that an excess of ammonium carbonate cannot be tolerated. Contrariwise, it is desirable to leave a tiny amount of unprecipitated magnesium over and above that due to the increased solubility of any magnesium carbonate in a solution of ammonium salts other than carbonate, such as the chloride and sulphate.

Due to another peculiarity of ammonium-magnesium compounds, this dictum is subject to a complete reversal in the event that such an excess of carbonated ammonia be used as to constitute an excess of over 100% above the stoichiometric requirement. If such an excess be used, and prolonged agitation of the sludge for several hours be employed, then the finely grained magnesium carbonate initially formed is replaced with a coarsely crystalline double carbonate of magnesium and ammonium. This substance is exquisitely pure, due to such crystallization, and is easily removed and washed free from soluble impurities, due to its mechanical characteristics. After such removal and washing, the double salt is suspended in pure water and simply boiled to expel ammonium carbonate, the final product being a slurry of magnesium carbonate of exceptional purity, transcending even the standard known as "chemically pure" in analytical and not in commercial parlance.

While the theme of my disclosure is concerned, chiefly, with the production of a very pure magnesium carbonate from relatively impure brines such brine as herein used as my preferred illustration requires some mention of the relatively magnesium-free discard. The addition of any soluble phosphate until no further precipitation takes place will result in a mixture of magnesium and lithium phosphates which is easily separated from the residual solution now consisting chiefly of sodium, potassium, and ammonium salts. If desired the potash component is readily obtained by crystallization, and obviously, conventional treatment with lime and distillation will evolve ammonia suitable for re-use in the production of carbonated ammonia. In this connection it may be mentioned that the concentration of the brine at any stage herein can be kept constant by using as the absorbing medium for re-cycled ammonia and its carbonation, that filtrate remaining after the final precipitation of the resident magnesium.

Having thus fully described my process, I claim:

The method of processing a magnesium bearing brine, containing calcium as an impurity, which comprises; commingling said brine with an amount of a carbonate selected from the group consisting of potassium, sodium, lithium and ammonium, in at least 100% excess over and above the stoichiometric requirements to combine with calcium resident in said brine, settling the mixture to produce as a clear overflow a solution consisting essentially of water-soluble magnesium salts, and a settled slurry consisting of precipitated calcium carbonate, magnesium carbonate and circum-ambient brine and re-cycling a portion of said slurry to the mixture of brine and carbonate above described in such an amount as shall produce a substantially calcium-free overflow from said settling step; commingling said overflow with a sufficient amount of carbonated ammonia to precipitate approximately one-half of the resident magnesium, said carbonated ammonia being produced by the addition of $NH_3$ and $CO_2$ to a solution of salts derived at a later step in the process, the ratio of $CO_2$ to $NH_3$ in the carbonated ammonia thus formed being maintained to produce an ammonium compound containing more $CO_2$ than the stoichiometric content of $CO_2$ in normal ammonium carbonate; separating the precipitate of magnesium carbonate thus produced from the solution of magnesium and ammonium salts in which it is suspended; commingling said solution of ammonium and magnesium salts with additional carbonated ammonia of the same composition as that previously described but in an amount in excess of that required to convert the resident magnesium into the double carbonate of magnesium and ammonium; agitating the mixture until crystallization of said double carbonate is substantially complete; separating the resultant precipitate of solid magnesium-ammonium carbonate from the clear liquid in which it is suspended; commingling a portion of said clear liquid with $NH_3$ and $CO_2$ to produce the carbonated ammonia previously described and re-cycling same into the process where required for the precipitation of magnesium carbonate; commingling the solid magnesium-ammonium carbonate previously separated with water to form a slurry and heating same until evolution of ammonia and carbon dioxide is complete with attendant formation of magnesium carbonate; re-cycling said mixture of ammonia and carbon dioxide to make the carbonated ammonia previously described and recovering the magnesium carbonate.

References Cited in the file of this patent

UNITED STATES PATENTS

| | | |
|---|---|---|
| 1,242,434 | Glaser | Oct. 9, 1917 |
| 1,963,711 | Mitteau | June 19, 1934 |
| 2,458,847 | Gloss | Jan. 11, 1949 |
| 2,765,212 | Froelich | Oct. 2, 1956 |
| 2,785,950 | Thomsen | Mar. 19, 1957 |